United States Patent [19]

Hofmeister et al.

[11] Patent Number: 5,712,333
[45] Date of Patent: Jan. 27, 1998

[54] BLENDS OF POLYCARBONATE AND LINEAR ETHYLENE POLYMERS

[75] Inventors: Frank M. Hofmeister, Richwood; Hani Farah, Sugarland; Morgan M. Hughes, Angleton; Steve R. Ellebracht, Lake Jackson, all of Tex.

[73] Assignee: The Dow Chemical Company, Midland, Mich.

[21] Appl. No.: 689,224

[22] Filed: Aug. 12, 1996

Related U.S. Application Data

[62] Division of Ser. No. 419,070, Apr. 7, 1995.

[51] Int. Cl.$^6$ .............................. C08L 69/00; C08L 23/04
[52] U.S. Cl. .................. 524/140; 524/155; 524/409; 524/445; 524/449; 524/451; 524/508; 525/65; 525/67; 525/133; 525/146; 525/148
[58] Field of Search ................... 524/140, 155, 524/409, 445, 449, 451, 508; 525/65, 67, 133, 146, 148

[56] References Cited

U.S. PATENT DOCUMENTS

| | | | |
|---|---|---|---|
| 4,564,658 | 1/1986 | Liu. | |
| 4,666,985 | 5/1987 | Liu | 525/146 |
| 4,840,995 | 6/1989 | Tamura et al.. | |
| 4,843,129 | 6/1989 | Spenadel et al. | 525/240 |
| 4,889,898 | 12/1989 | Liang. | |
| 5,346,963 | 9/1994 | Hughes et al.. | |
| 5,367,016 | 11/1994 | Miyama et al.. | |
| 5,416,148 | 5/1995 | Farah | 525/146 |
| 5,420,199 | 5/1995 | Fujie. | |

FOREIGN PATENT DOCUMENTS

| | | |
|---|---|---|
| 0110222 | 6/1984 | European Pat. Off.. |
| 0416815A2 | 8/1990 | European Pat. Off.. |
| 58-167644 | 10/1983 | Japan. |
| 59-66448-A | 4/1984 | Japan. |
| 1-20655 | 4/1989 | Japan. |
| H5-39415 | 2/1993 | Japan. |
| H5-79700-B | 11/1993 | Japan. |
| 06859 | 3/1994 | WIPO. |

Primary Examiner—David Buttner

[57] ABSTRACT

A blend of polycarbonate and a homogeneously branched, linear ethylene polymer, which blend has a desirable balance of impact resistance and toughness properties.

25 Claims, No Drawings

5,712,333

BLENDS OF POLYCARBONATE AND LINEAR ETHYLENE POLYMERS

CROSS-REFERENCE TO RELATED APPLICATION

This is a divisional of application Ser. No. 08/419,070 filed Apr. 7, 1995.

FIELD OF THE INVENTION

This invention relates to compositions containing polycarbonate and a linear ethylene polymer, and to methods of preparation of such compositions.

BACKGROUND OF THE INVENTION

Polycarbonate has found many uses because, in general, it combines a high level of heat resistance and dimensional stability with good insulating and non-corrosive properties, and it is easily molded. It does, however, suffer from a tendency to craze and crack under the effects of contact with organic solvents such as gasoline. An undesirable result in polycarbonate which has crazed is that it is more likely to experience brittle rather than ductile failure. This disadvantage has been somewhat relieved by the practice of blending polycarbonate with various olefin polymers such as low density polyethylene or linear low density polyethylene, or thermoplastic rubbers such as ethylene/propylene copolymer. These added substances are capable of improving the resistance of polycarbonate to solvents, but they tend to delaminate and cause an offsetting reduction in the toughness, impact resistance and weldline strength of the blended polycarbonate composition. Such delamination, and the resulting loss of utility, is reported, for example, in U.S. Pat. No. 4,496,693.

Impact resistance in polycarbonate can be improved by the incorporation of emulsion or core-shell elastomers such as methacrylate/butadiene/styrene copolymer or a butyl acrylate rubber. However, these core-shell rubbers hinder processability of the blend by increasing viscosity and impart no improvement to the solvent resistance of polycarbonate. It would accordingly be desirable if modifers blended with polycarbonate for the purpose of improving its solvent resistance did not also deleteriously affect its toughness and impact and weldline strength, and cause delamination as evidenced by peeling or splintering in a molded article. It is an object of this invention to provide a modifier for polycarbonate which imparts a desirable balance of both impact and solvent resistance.

SUMMARY OF THE INVENTION

In one aspect, this invention involves a composition of matter containing, in admixture, polycarbonate and a linear ethylene polymer. In another aspect, this invention involves the inclusion with such a composition of a styrenic copolymer, a supplemental impact modifier and/or an additional molding polymer.

It has been found that articles molded from the compositions of this invention show no tendency toward delamination and exhibit a desirable balance of surprisingly high levels of impact resistance, solvent resistance and processability.

The compositions of this invention are useful, for example, in the production of films, fibers, extruded sheets, multi-layer laminates and molded or shaped articles of virtually all varieties, especially data storage apparatus, appliance and instrument housings, motor vehicle body panels and other parts and components for use in the automotive, electrical and electronics industries. The methods of this invention are useful for preparing compositions and extruded or molded articles having applications which are the same as or similar to the foregoing.

DETAILED DESCRIPTION OF THE INVENTION

The compositions of this invention are those in which (a) polycarbonate has been admixed in a polymeric blend with (b) a linear ethylene polymer. The compositions of this invention may, optionally, also contain (c) a styrenic copolymer, (d) a supplemental impact modifier, and (e) one or more additional molding polymers. Suitable ranges of content for components (a) and (b) in the compositions of this invention, and suitable ranges of content for components (c), (d) and (e) if and when they are present, expressed in parts by weight of the total composition, are as follows:

(a) polycarbonate at least about 60 parts, advantageously at least about 70 parts, and preferably at least about 80 parts, and yet not more than about about 99 parts, advantageously not more than about 98 parts, and preferably not more than about 95 parts;

(b) linear ethylene polymer at least about 1 parts, advantageously at least about 2 parts, and preferably at least about 5 parts, and yet not more than about about 40 parts, advantageously not more than about 30 parts, and preferably not more than about 20 parts;

(c) styrenic copolymer at least about 5 parts, advantageously at least about 10 parts, preferably at least about 15 parts, and more preferably at least about 20 parts, and yet not more than about about 75 parts, advantageously not more than about 55 parts, preferably not more than about 50 parts, and more preferably not more than about 45 parts;

(d) supplemental impact modifier at least about 0.1 parts, advantageously at least about 0.5 parts, preferably at least about 1 parts, and more preferably at least about 3 parts, and yet not more than about about 25 parts, advantageously not more than about 20 parts, preferably not more than about 15 parts, and more preferably not more than about 10 parts; and (e) molding polymer at least about 5 parts, advantageously at least about 10 parts, preferably at least about 15 parts, and more preferably at least about 20 parts, and yet not more than about about 75 parts, advantageously not more than about 55 parts, preferably not more than about 50 parts, and more preferably not more than about 45 parts.

The number of weight parts of the various components from which the compositions of this invention may be prepared may, but need not necessarily, total to 100 weight parts.

Also included within this invention are the reaction products, if any, of the above named components when admixed in the compositions of this invention.

Preparation of the compositions of this invention can be accomplished by any suitable mixing means known in the art. Typically the polycarbonate and substantially linear ethylene polymer, and other components or additives which are optionally present in the compositions of this invention, are dry blended in a tumbler or shaker in powder or particulate form with sufficient agitation to obtain thorough distribution thereof. If desired, the dry-blended formulation can further be subjected to malaxation or to shearing stresses at a temperature sufficient to cause heat plastification, for example by processing in an extruder with or without a vacuum. Other apparatus which can be used in the mixing process include, for example, a roller mill, a Henschel mixer, a ribbon blender, a Banbury mixer, or a reciprocating screw injection molding machine. The components may be mixed simultaneously or in any sequence.

When softened or melted by the application of heat, the compositions of this invention are useful for fabrication and can be formed or molded using conventional techniques such as compression, injection molding, gas assisted injection molding, calendering, vacuum forming, thermoforming, extrusion and/or blow molding, alone or in combination. The compositions can also be formed, spun or drawn into films, fibers (such as tire cord), multi-layer laminates or extruded sheets, or can be compounded with one or more organic or inorganic substances, on any machine suitable for such purpose.

Component (a) in the compositions of this invention is a polycarbonate, which can be prepared from a dihydroxy compound such as a bisphenol, and a carbonate precursor such as a disubstituted carbonic acid derivative, a haloformate (such as a bishaloformate of a glycol or dihydroxy benzene), or a carbonate ester such as diphenyl carbonate or a substituted derivative thereof. These components are often reacted by means of the phase boundary process in which the dihydroxy compound is dissolved and deprotonated in an aqueous alkaline solution to form bisphenolate, and the carbonate precursor is dissolved in an organic solvent.

These components are often reacted by means of a mixture prepared initially from the aromatic dihydroxy compound, water and a non-reactive organic solvent immiscible with water selected from among those in which the carbonate precursor and polycarbonate product are soluble. Representative solvents include chlorinated hydrocarbons such as methylene chloride, 1,2-dichloroethane, tetrachloroethane, chlorobenzene, and chloroform. Caustic soda or other base is then added to the reaction mixture to adjust the pH of the mixture to a level at which the dihydroxy compound is activated to dianionic form.

A carbonate precursor is contacted with an agitated mixture of the aqueous alkaline solution of the dihydroxy compound, and, for such purpose, the carbonate precursor can be bubbled into the reaction mixture in the form of a gas, or can be dissolved and introduced in solution form. Carbonater precursor is typically used in an amount of about 1.0 to 1.8, preferably about 1.2 to 1.5, moles per mole of dihydroxy compound. The mixture is agitated in a manner which is sufficient to disperse or suspend droplets of the solvent containing the carbonate precursor in the aqueous alkaline solution. Reaction between the organic and aqueous phases created by such agitation yields the bis(carbonate precursor)ester of the dihydroxy compound. For example, if the carbonate precursor is a carbonyl halide such as phosgene, the products of this initial phase of the process are monomers or oligomers which are either mono- or dichloroformates, or contain a phenolate ion at each terminus.

These intermediate mono- and oligocarbonates dissolve in the organic solvent as they form, and they can then be condensed to a higher molecular weight polycarbonate by contact with a coupling catalyst of which the following are representative: a tertiary amine such as triethyl amine and dimethyl amino pyridine.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolatilization in a vented extruder, or precipitation by use of an anti-solvent such as toluene, cyclohexane, heptane, methanol, hexanol, or methyl ethyl ketone.

In the melt process for preparation of polycarbonate, aromatic diesters of carbonic acid are condensed with an aromatic dihydroxy compound in a transesterification reaction in the presence of a basic catalyst. The reaction is typically run at about 250° C. to 300° C. under vacuum at a progressively reduced pressure of about 1 to 100 mm Hg.

Polycarbonate can also be prepared in a homogeneous solution through a process in which a carbonate precursor, such as phosgene, is contacted with a solution containing an aromatic dihydroxy compound, a chlorinated hydrocarbon solvent and a substance, such as pyridine, dimethyl aniline or CaOH, which acts as both acid acceptor and condensation catalyst.

Examples of some dihydroxy compounds suitable for the preparation of polycarbonate include variously bridged, substituted or unsubstituted aromatic dihydroxy compounds (or mixtures thereof) represented by the formula

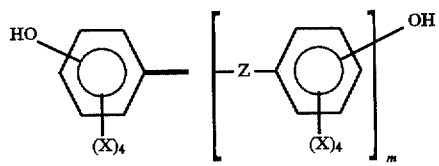

wherein:

(I) Z is (A) a divalent radical, of which all or different portions can be (i) linear, branched, cyclic or bicyclic, (ii) aliphatic or aromatic, and/or (iii) saturated or unsaturated, said divalent radical being composed of 1–35 carbon atoms together with up to five oxygen, nitrogen, sulfur, phosphorous and/or halogen (such as fluorine, chlorine and/or bromine) atoms; or (B) S, $S_2$, SO, $SO_2$, O or CO; or (C) a single bond;

(II) each X is independently hydrogen, a halogen (such as fluorine, chlorine and/or bromine), a $C_1$–$C_{12}$, preferably $C_1$–$C_8$, linear or cyclic (and optionally halogen-substituted) alkyl, aryl, alkaryl, aralkyl, alkoxy or aryloxy radical, such as methyl, ethyl, isopropyl, cyclopentyl, cyclohexyl, methoxy, ethoxy, benzyl, tolyl, xylyl, phenoxy and/or xylynoxy; or a nitro or nitrile radical; and (III) m is 0 or 1.

For example, the bridging radical represented by Z in the above formula can be a $C_2$–$C_{30}$ alkyl, cycloalkyl, alkylidene or cycloalkyidene radical, or two or more thereof connected by an aromatic or ether linkage, or can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3CCl_3$, $CF_2Cl$, CN, $(CH_2)_2COOCH_3$, or $PO(OCH_3)_2$.

Representative examples of dihydroxy compounds of particular interest are the bis(hydroxyphenyl)alkanes, the bis(hydroxyphenyl)cycloalkanes, the dihydroxydiphenyls and the bis(hydroxyphenyl)sulfones, and in particular are 2,2-bis(4-hydroxyphenyl)propane ("Bisphenol-A" or "Bis-A"); 2,2-bis(3,5-dihalo-4-hydroxyphenyl)propane ("Tetrahalo Bisphenol-A") where the halogen can be fluorine, chlorine, bromine or iodine, for example 2,2-bis(3, 5-dibromo-4-hydroxyphenyl)propane ("Tetrabromo Bisphenol-A" or "TBBA"); 2,2-bis(3,5-dialkyl-4-hydroxyphenyl)propane ("Tetraalkyl Bisphenol-A") where the alkyl can be methyl or ethyl, for example 2,2-bis(3,5-dimethyl-4-hydroxyphenyl)propane ("Tetramethyl Bisphenol-A"); 1,1-bis(4-hydroxyphenyl)-1-phenyl ethane ("Bisphenol-AP" or "Bis-AP"); Bishydroxy phenyl fluorene; and 1,1-bis(4-hydroxyphenyl)cyclohexane.

Using a process such as is generally described above, a polycarbonate product can be obtained having a weight average molecular weight, as determined by light scattering or gel permeation chromatography, of 8,000 to 200,000 and preferably 15,000 to 40,000, and/or a melt flow value of about 3 to 150, preferably about 10 to 80 (as determined by ASTM Designation D 1238-89, Condition 300/1.2), although values outside these ranges are permitted as well. Molecular weight can be controlled by addition to the reaction mixture of a chain terminator which may be selected from monofunctional substances such as phenols, carbonic acid chlorides, or phenylchlorocarbonates.

A branched rather than linear polycarbonate molecule can be obtained by adding to the reaction mixture a tri- or polyfunctional monomer such as trisphenoxy ethane.

The preferred process of this invention is that in which an aromatic polycarbonate is prepared. An aromatic polycarbonate is defined herein with reference to the oxygen atoms, of the one or more dihydroxy compounds present in the polycarbonate chain, which are bonded to a carbonyl carbon of the carbonate precursor. In an aromatic polycarbonate, all such oxygen atoms are bridged by a dihydroxy compound residue some portion of which is an aromatic ring.

Also included within the term "polycarbonate", as used herein, are various copolycarbonates, certain of which can be prepared by incorporating one or more different dihydroxy compounds into the reaction mixture. When a dicarboxylic acid such terephthalic acid or isophthalic acid (or an ester-forming derivative thereof) or a hydroxycarboxylic acid is used in the reaction mixture, or to form an oligomeric prepolymer, instead of one of the "different" dihydroxy compounds mentioned above, a poly(ester/carbonate) is obtained, which is discussed in greater detail in Swart, U.S. Pat. No. 4,105,533 (which is incorporated herein). In a preferred embodiment, the compositions of this invention exclude a poly(ester/carbonate).

Copolycarbonates can also be prepared, for example, by reaction of one or more dihydroxy compounds with a carbonate precursor in the presence of a chlorine- or amino-terminated polysiloxane, with a hydroxy-terminated poly (phenylene oxide) or poly(methyl methacrylate), or with phosphonyl dichloride or an aromatic ester of a phosphonic acid. Siloxane/carbonate block copolymers are discussed in greater detail in Paul, U.S. Pat. No. 4,596,970, which is incorporated herein.

The methods generally described above for preparing carbonate polymers suitable for use in the practice of this invention are well known; for example, several methods are discussed in detail in Schnell, U.S. Pat. No. 3,028,365; Glass, U.S. Pat. No. 4,529,791; and Grigo, U.S. Pat. No. 4,677,162, each of which is incorporated as a part hereof.

Component (b) in the compositions of this invention, a homogeneously branched linear ethylene polymer, is from a known class of polymers which have a linear polymer backbone, no long chain branching and a narrow molecular weight distribution. Such polymers may be interpolymers of ethylene and one or more α-olefin comonomers of from about 3 to about 20 carbon atoms, but are preferably copolymers of ethylene with just one $C_3$–$C_{20}$ α-olefin, and are more preferably copolymers of ethylene with 1-butene, 1-hexene, 4-methyl-1-pentene or 1-octene. This class of polymers is disclosed, for example, by Elston in U.S. Pat. No. 3,645,992, which is incorporated herein by reference. Processes using metallocene catalysts to produce such homogeneously branched, linear ethylene polymers have been developed, as shown, for example, in Ewen, U.S. Pat. No. 4,937,299, EP 129,368, EP 260,999, U.S. Pat. No. 4,701,432, U.S. Pat. No. 4,937,301, U.S. Pat. No. 4,935,397, U.S. Pat. No. 5,055,438 and WO 90/07526, each of which is incorporated herein by reference. The polymers can be made by conventional polymerization processes such as gas phase, slurry or solution.

These linear ethylene polymers have a homogeneous branching distribution. The terms "homogeneously branched" and "homogeneous branching distribution" refer to the fact that (1) the α-olefin comonomer(s) is/are randomly distributed within a given molecule of an ethylene/comonomer copolymer; (2) substantially all of the copolymer molecules have the same ethylene/comonomer ratio; (3) the polymer is characterized by a narrow short chain branching distribution; (4) the polymer essentially lacks a measurable high density, crystalline polymer fraction [as measured, for example, by techniques such as those involving polymer fractional elutions as a function of temperature]; and (5) the polymer is characterized, as determined from the conditions described in 21 C.F.R. 177.1520(c) and (d), as having (i) substantially reduced levels of n-hexane extractables (for example, less than 1% extractables for an ethylene/1-octene copolymer at densities greater than about 0.90 g/cc), or (ii) substantial amorphism, which is indicated when greater than 75 wt % of the polymer is soluble under the specified conditions (for example, ethylene/1-octene copolymer is 90% soluble at a density of about 0.90 g/cc, and is 100% is soluble at a density of about 0.88 g/cc).

The homogeneity or narrowness of the branching distribution is indicated by the value of the Composition Distribution Branch Index ("CDBI") or the Short Chain Branch Distribution index. CDBI is defined as the weight percent of the polymer molecules having a comonomer content within 50 percent of the median total molar comonomer content. The CDBI of a polymer is readily calculated, for example, by employing temperature rising elution fractionation, as described in Wild, *Journal of Polymer Science*, Polymer Physics Edition, Volume 20, page 441 (1982), or in U.S. Pat. No. 4,798,081 (each being incorporated herein by reference). The CDBI for the homogeneously branched linear polymers used in the present invention is greater than about 30 percent, preferably greater than about 50 percent, and more preferably greater than about 90 percent.

Since they are linear, the homogeneously branched ethylene polymers of component (b) have no long-chain branching. Long-chain branching is determined by using $^{13}C$ nuclear magnetic resonance spectroscopy, and is quantified using the method described by Randall in *Journal of Macromolecular Science-Reviews in Macromolecular Chemistry and Physics*, Volume C29, pages 285–297 (1989), which is incorporated herein by reference. Since, however, the portion of a long-chain branch beyond the sixth carbon atom cannot be distinguished using $^{13}C$ nuclear magnetic resonance spectroscopy for the purpose of determining the precise length of the long-chain branch, a long-chain branch may be variously described as longer than 6 carbon atoms; in most cases substantially longer than 6 carbon atoms, for example, longer than 20 carbons; and in some cases about the same length as the polymer backbone itself.

The homogeneously branched linear ethylene polymers used in the present invention have a single melting peak, as measured by differential scanning calorimetry (DSC), in contrast to heterogeneously branched linear ethylene polymers, which have 2 or more melting peaks because of their broad branching distribution.

The density of the homogeneously branched linear ethylene polymers of component (b) is measured in accordance with ASTM D-792, and is generally less than 0.93 g/cm$^3$, preferably less than 0.90 g/cm$^3$, more preferably from about 0.85 g/cm$^3$ to about 0.90 g/cm$^3$, most preferably from about 0.85 g/cm$^3$ to about 0.89 g/cm$^3$, and especially from about 0.85 g/cm$^3$ to about 0.88 g/cm$^3$.

The molecular weight of these homogeneously branched linear ethylene polymers is conveniently indicated using a melt index measurement according to ASTM D-1238, Condition 190° C./2.16 kg [formerly known as "Condition (E)" and also known as $I_2$]. Melt index value is inversely proportional to the molecular weight of the polymer. Thus, the higher the molecular weight, the lower the melt index, although the relationship is not linear. The $I_2$ melt index for the homogeneously branched linear ethylene polymers used herein is generally from about 0.01 grams/10 minutes ("g/10 min") to about 1,000 g/10 min, preferably from about 0.1 g/10 min to about 250 g/10 min, and more preferably from about 0.5 g/10 min to about 10 g/10 min.

Another measurement useful in characterizing the molecular weight of the homogeneously branched linear ethylene polymers used herein is a melt index measurement according to ASTM D-1238, Condition 190° C./10 kg [formerly known as "Condition (N)" and also known as $I_{10}$]. The ratio of these two melt index terms is the melt flow ratio and is designated as $I_{10}/I_2$. Generally, the $I_{10}/I_2$ ratio of the homogeneously branched linear ethylene polymers is 6 or less. In general, when the $I_{10}/I_2$ ratio of the homogeneously branched, linear ethylene polymers increases, the molecular weight distribution [weight average molecular weight divided by number average molecular weight ("Mw/Mn")] of the homogeneously branched linear ethylene polymers also increases.

The molecular weight distribution of the homogeneously branched linear ethylene polymers may be determined from data generated by gel permeation chromatography (GPC). An instrument typically used for this purpose is a Waters 150° C. high temperature chromatographic unit equipped with three mixed porosity columns (Polymer Laboratories 10$^3$, 10$^4$, 10$^5$ and 10$^6$), operating at a system temperature of 140° C. The solvent used is 1,2,4-trichlorobenzene, from which 0.3 weight percent solutions of the samples are prepared for injection. The flow rate is 1.0 milliliter/minute, and the injection size is 200 microliters.

Molecular weight determination for polyethylene is made by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene, as described by Williams and Word in *Journal of Polymer Science*, Polymer Letters, volume 6, page 621, 1968 (incorporated herein by reference), to derive the following equation: $M_{polyethylene}=a*(M_{polystyrene})^b$ in which a=0.4316, b=1.0, and M is molecular weight. Weight average molecular weight, Mw, is calculated in the usual manner according to the following formula: Mw=Σ w$_i$*M$_i$, where wi and M$_i$ are the weight fraction and molecular weight, respectively, of the i$^{th}$ fraction eluting from the GPC column. Number average molecular weight, Mn, is calculated in the usual manner according to the following formula: Mn=[Σ n$_i$*M$_i$] /Σ n$_i$, where n$_i$ and M$_i$ are, respectively, the number of molecules in, and the molecular weight of, the i$^{th}$ fraction eluting from the GPC column. The symbol * indicates a step of multiplication. The $M_w/M_n$ of the homogeneously branched linear ethylene polymers is generally less than about 3.0, and is often from about 1.5 to about 2.5.

The term "homogeneously branched linear ethylene polymers" as used herein does not include, by definition, heterogeneously branched linear low density polyethylenes or linear high density polyethylenes made using Ziegler-Natta polymerization processes (as described, for example, in Anderson, U.S. Pat. No. 4,076,698, which is incorporated herein); or the branched high pressure, free-radical polyethylenes and other high pressure ethylene copolymers (e.g., ethylene/vinyl acetate or ethylene/vinyl alcohol copolymers) which are known to those skilled in the art to have numerous long chain branches.

Component (c) in the compositions of this invention is a styrenic copolymer prepared from one or more styrenic monomers and one or more ethylenically unsaturated monomers copolymerizable with a styrenic monomer. The styrenic copolymer may be a random, alternate, block or grafted copolymer, and a mixture of more than one styrenic copolymer may be used as well.

Styrenic monomers of particular interest for use in preparation of a styrenic copolymer, in addition to styrene itself, include one or more of the substituted styrenes or vinyl aromatic compounds described by the following formula [it being understood that a reference to "styrene" as a comonomer in component (c) is to be read as a reference to any of the styrenic or vinyl aromatic monomers described herein or any others of like kind]:

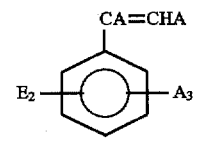

wherein each A is independently hydrogen, a $C_1$–$C_6$ alkyl radical or a halogen atom such as chlorine or bromine; and each E is independently hydrogen, a $C_1$–$C_{10}$ alkyl, cycloalkyl, alkenyl, cycloalkenyl, aryl, alkaryl, aralkyl or alkoxy radical, a halogen atom such as chlorine or bromine, or two E's may be joined to form a naphthalene structure. Representative examples of suitable styrenic monomers, in addition to styrene itself, include one or more of the following: ring-substituted alkyl styrenes, e.g. vinyl toluene, o-ethylstyrene, p-ethylstyrene, ar-(t-butyl)styrene, 2,4-dimethylstyrene; ring-substituted halostyrenes, e.g., o-chlorostyrene, p-chlorostyrene, o-bromostyrene, 2,4-dichlorostyrene; ring-alkyl, ring-halo-substituted styrenes, e.g. 2-chloro-4-methylstyrene and 2,6-dichloro-4-methylstyrene; ar-methoxy styrene, vinyl naphthalene or anthracene, p-diisopropenylbenzene, divinylbenzene, vinylxylene, alpha-methylstyrene, and alphamethylvinyltoluene.

Ethylenically unsaturated monomers of particular interest for copolymerization with a styrenic monomer include one or more of those described by the formula: D—CH=C(D)—(CH$_2$)$_n$—G, wherein each D independently represents a substituent selected from the group consisting of hydrogen, halogen (such as fluorine, chlorine or bromine), $C_1$–$C_6$ alkyl or alkoxy, or taken together represent an anhydride linkage; G is hydrogen, vinyl, $C_1$–$C_{12}$ alkyl, cycloalkyl, alkenyl, cycloalkenyl, alkaryl, arylalkyl, alkoxy, aryloxy, ketoxy, halogen (such as fluorine, chlorine or bromine), cyano or pyridyl; and n is 0–9.

Representative examples of ethylenically unsaturated monomers copolymerizable with a styrenic monomer are those which bear a polar or electronegative group and include one or more of the following: a vinyl nitrile compound such as acrylonitrile, methacrylonitrile, ethacrylonitrile, alphachloroacrylonitrile and fumaronitrile; a diene such as butadiene, isoprene, isobutylene, piperylene, cyclopentadiene, natural rubber, chlorinated rubber, 1,2-hexadiene, methyl-1,3-pentadiene, 2,3-dimethyl-1,3-1,3-pentadiene, 2-methyl-3-ethyl-1,3-butadiene, 2-ethyl-1,3-pentadiene, 1,3- and 2,4-hexadienes, chloro- and bromo-substituted butadienes such as dichlorobutadiene, bromobutadiene, chloroprene and dibromobutadiene, and butadiene/isoprene and isoprene/isobutylene copolymers; 1,3-divinylbenzene; 2-phenyl propene; a $C_2-C_{10}$ alkylene compound including halo-substituted derivatives thereof such as vinyl or vinylidine chloride; the alpha,beta-ethylenically unsaturated carboxylic acids, such as acrylic acid, methacrylic acid, maleic acid, succinic acid, aconitic acid and itaconic acid, and their anhydrides and $C_1-C_{10}$ alkyl, aminoalkyl and hydroxyalkyl esters and amides, such as alkyl acrylates and methacrylates such as methyl acrylate, propyl acrylate, butyl acrylate, octyl acrylate, methyl alphachloro acrylate, methyl, ethyl or isobutyl methacrylate, hydroxyethyl and hydroxypropyl acrylates, aminoethyl acrylate and glycidyl methacrylate; maleic anhydride; an alkyl or aryl maleate or fumarate such as diethylchloromaleate or diethyl fumarate; an aliphatic or aromatic maleimide, such as N-phenyl maleimide, including the reaction product of a $C_1-C_{10}$ alkyl or $C_6-C_{14}$ aryl primary amine and maleic anhydride; methacrylamide, acrylamide or N,N-diethyl acrylamide; vinyl ketones such as methyl vinyl ketone or methyl isopropenyl ketone; vinyl or allyl acetate and higher alkyl or aryl vinyl or allyl esters; vinyl alcohols; vinyl ethers such as $C_1-C_6$ alkyl vinyl ether and their alkyl-substituted halo derivatives; vinyl pyridines; vinyl furans; vinyl aldehydes such as acrolein or crotonaldehyde; vinyl carbazole; vinyl pyrrolidone; N-vinylphthalimide; and an oxazoline compound includes those of the general formula

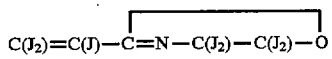

where each J is independently hydrogen, halogen, a $C_1-C_{10}$ alkyl radical or a $C_6-C_{14}$ aryl radical; and the like.

Examples of preferred styrenic copolymers are vinyl aromatic/vinyl nitrile copolymers such as styrene/acrylonitrile copolymer ("SAN"), styrene/maleic anhydride copolymer, styrene/glycidyl methacrylate copolymer, aryl maleimimde/vinyl nitrile/diene/styrene copolymer, styrene/alkyl methacrylate copolymer, styrene/alkyl methacrylate/glydicyl methacrylate copolymer, styrene/butyl acrylate copolymer, methyl methacryalte/acrylonitrile/butadiene/styrene copolymer, or a rubber-modified vinyl aromatic/vinyl nitrile copolymer such as an ABS, AES or ASA copolymer.

ABS (acrylonitrile/butadiene/styrene copolymer) is an elastomeric-thermoplastic composite in which vinyl aromatic/vinyl nitrile copolymer is grafted onto a polybutadiene substrate latex. The polybutadiene forms particles of rubber—the rubber modifier or elastomeric component—which are dispersed as a discrete phase in a thermoplastic matrix formed by random vinyl aromatic/vinyl nitrile copolymer. Typically, vinyl aromatic/vinyl nitrile copolymer is both occluded in and grafted to the particles of rubber. AES (acrylonitrile/EPDM/styrene) copolymer is a styrenic copolymer which is obtained when vinyl aromatic/vinyl nitrile copolymer is rubber-modified by grafting vinyl aromatic/vinyl nitrile copolymer to a substrate made up of an EPDM (ethylene/propylene/non-conjugated diene) rubber. AES copolymers are discussed in greater detail in Henton, U.S. Pat. No. 4,766,175, which is incorporated as a part hereof. A vinyl aromatic/vinyl nitrile copolymer can also be crosslinked to an alkyl acrylate elastomer to form a rubber-modified styrenic copolymer, as in the case of an ASA (acrylonitrile/styrene/acrylate) copolymer, which is discussed in greater detail in Yu, U.S. Pat. No. 3,944,631, which is also incorporated as a part hereof.

The monomers copolymerized to form a styrenic copolymer may each be used in virtually any amount from 1 to 99 weight percent, but a styrenic copolymer will typically contain at least about 15 percent by weight, preferably at least about 35 percent by weight, and more preferably at least about 60 percent by weight of a styrenic monomer, with the balance being made up of one or more copolymerizable ethylenically unsaturated monomers.

When rubber modified, a styrenic copolymer will typically contain at least about 15 percent by weight, preferably at least about 25 percent by weight, and more preferably at least about 35 percent by weight of a styrenic monomer, with the balance being made up of one or more copolymerizable ethylenically unsaturated monomers. The elastomeric phase of a rubber-modified styrenic copolymer as employed in the compositions of this invention is up to about 45 percent, preferably about 5 to 40 percent, more preferably about 10 to 35 percent, by weight of the copolymer. The preferred elastomeric phase exhibits a glass transition temperature ($T_g$) generally less than 0° C., more preferably less than –30° C., and most preferably from about –110° C. to about –50° C. as determined by ASTM D-746-52T or -56T. The elastomeric phase advantageously has an average particle size of about 10 microns or less, preferably in the range from about 0.05 to about 5 microns, and more preferably in the range from about 0.1 to about 0.3 microns, and typically exhibits an intrinsic viscosity, as determined at 25° C. in toluene, of about 0.1 to about 5. In addition to the aforementioned monomeric components, it should be understood that the elastomeric phase may also contain relatively small amounts, usually less than about 2 weight percent based on the rubber, of a crosslinking agent such a divinylbenzene, diallylmaleate, ethylene glycol dimethacrylate and the like provided that such crosslinking does not eliminate the desired elastomeric character of rubber.

The molecular weight of a styrenic copolymer is not particularly critical so long as its melt flow viscosity is such that it can be melt blended with the other components of the compositions of this invention. Preferably, however, the melt flow viscosity of the styrenic copolymer as determined by ASTM D-1238–65T(1) is from about 0.01 to about 10, more preferably from about 0.1 to about about 5, and most preferably from about 2 to about 3, deciliters per minute. When the ethylenically unsaturated monomer possesses a polar group, the polar group typically has a group moment of about 1.4 to 4.4 Debye units, although values outside such ranges are permitted as well. A styrenic copolymer may be made by an emulsion, suspension or mass (bulk) method.

Methods for making ABS or other styrenic copolymers, as described above, are discussed in greater detail in Childers, U.S. Pat. No. 2,820,773, Calvert, U.S. Pat. No. 3,238,275, Carrock, U.S. Pat. No. 3,515,692, Ackerman, U.S. Pat. No. 4,151,128, Kruse, U.S. Pat. No. 4,187,260, Simon, U.S. Pat. No. 4,252,911 Weber, U.S. Pat. No. 4,526,926, Rudd, U.S. Pat. No. 4,163,762 and Weber, U.S. Pat. No. 4,624,986, each being hereby incorporated as a part hereof.

Component (d) in the compositions of this invention is a supplemental impact modifier, including, for example, elastomers such as a block copolymer, a core-shell grafted copolymer or mixtures thereof. A block copolymer useful as a supplemental impact modifier herein can be either linear, branched, radial or teleblock, and can be either a di-block ("A-B") copolymer, tri-block ("A-B-A") copolymer, or radial teleblock copolymer with or without tapered sections, i.e. portions of the polymer where the monomers alternate or are in random order close to the point of transition between the A and B blocks. The A portion is frequently prepared by polymerizing one or more vinyl aromatic hydrocarbon monomers, and has a weight average molecular weight of about 4,000 to about 115,000, preferably about 8,000 to about 60,000. The B portion of the block copolymer typically results from polymerizing a diene and has a weight average molecular weight of about 20,000 to about 450,000, preferably about 50,000 to about 300,000. In an A-B di-block copolymer, each block, A or B, can vary from 10–90% of the total weight of the copolymer. In an A-B-A tri-block copolymer, the A end groups typically constitute about 2 wt % to about 55 wt % of the whole block copolymer, and preferably are between 5 wt % and 45 wt % of the whole block copolymer.

The A block of the block copolymer has properties characteristic of thermoplastic substances in that it has the stability necessary for processing at elevated temperatures and yet possesses good strength below the temperature at which it softens. The A block of a vinyl aromatic block copolymer is polymerized predominantly from the various styrenic monomers described above with respect to a styrenic copolymer, but minor proportions of other copolymerizable ethylenically unsaturated monomers (also described above in the same context) may be used as well.

The B block is formed predominantly from substituted or unsubstituted $C_3$–$C_{10}$ dienes, particularly conjugated dienes such as butadiene or isoprene. Other diene or copolymerizable ethylenically unsaturated monomers (described above in connection with a styrenic copolymer) may be used in the formation of the B block provided that they are present at a level low enough to not alter the fundamental olefinic character of the B block. The B block will be characterized by elastomeric properties which allow it to to absorb and dissipate an applied stress and then regain its shape.

To reduce oxidative and thermal instability, the block copolymers used herein can also desirably be hydrogenated to reduce the degree of unsaturation on the polymer chain and on the pendant aromatic rings. The block copolymer may be selectively hydrogenated by hydrogenating only the elastomeric block B. Typical hydrogenation catalysts utilized are Raney nickel, molybdenum sulfide, finely divided palladium and platinum oxide. The hydrogenation reaction is typically run at 75°–450° F. and at 100–1,000 psig for 10–25 hours.

The most preferred vinyl aromatic block copolymers are vinyl aromatic/conjugated diene block copolymers formed from styrene and butadiene or styrene and isoprene. When the styrene/butadiene copolymers are hydrogenated, they are frequently represented as styrene/(ethylene/butylene) copolymer in the di-block form, or as styrene/(ethylene/butylene)/styrene copolymer in the tri-block form. When the styrene/isoprene copolymers are hydrogenated, they are frequently represented as styrene/(ethylene/propylene) copolymer in the di-block form, or as styrene/(ethylene/propylene)/styrene copolymer in the tri-block form. Vinyl aromatic/diene block copolymers such as are described above are discussed in greater detail in Holden, U.S. Pat. No. 3,265,766, Haefele, U.S. Pat. No. 3,333,024, Wald, U.S. Pat. No. 3,595,942, and Witsiepe, U.S. Pat. No. 3,651,014, each of which is incorporated herein, and many are available commercially as the various Kraton™ elastomers from Shell Chemical Company.

Core-shell grafted copolymer elastomers suitable for use herein as a supplemental impact modifier are those which are based on either a diene rubber, an alkyl acrylate rubber, or on mixtures thereof, and have an elastomeric, or rubber, phase which is greater than about 45% or more of the copolymer by weight. A core-shell grafted copolymer based on a diene rubber contains a substrate latex, or core, which is made by polymerizing a diene, preferably a conjugated diene, or by copolymerizing a diene with a mono-olefin or a polar vinyl compound, such as styrene, acrylonitrile, or an alkyl ester of an unsaturated carboxylic acid such as methyl methacrylate. The substrate latex is typically made up of about 40–85% diene, preferably a conjugated diene, and about 15–60% of the mono-olefin or polar vinyl compound. The elastomeric core phase should have a glass transition temperature ("$T_g$") of less than about 10° C., and preferably less than about −20° C. A mixture of ethylenically unsaturated monomers is then graft polymerized to the substrate latex. A variety of monomers may be used for this grafting purpose, of which the following are exemplary: vinyl compounds such as vinyl toluene or vinyl chloride; vinyl aromatics such as styrene, alpha-methyl styrene or halogenated styrene; acrylonitrile, methacrylonitrile or alpha-halogenated acrylonitrile; a $C_1$–$C_8$ alkyl acrylate such as ethyl acrylate or hexyl acrylate; a $C_1$–$C_8$ alkyl methacrylate such as methyl methacrylate or hexyl methacrylate; glycidyl methacrylate; acrylic or methacrylic acid; and the like or a mixture of two or more thereof. The preferred grafting monomers include one or more of styrene, acrylonitrile and methyl methacrylate.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is about 60–80 parts by weight substrate latex, about 10–20 parts by weight of each of the first and second monomer shells. A preferred formulation for an MBS rubber is one having a core built up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494, each of which is incorporated herein.

A core-shell grafted copolymer based on an alkyl acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$–$C_6$, most preferably butyl acrylate. The elastomeric core phase should have a $T_g$ of less than about 10° C., and preferably less than about −20° C. About 0.1 to 5 weight percent of (i) a cross-linking monomer which has a plurality of addition polymerizable reactive groups all of which polymerize at substantially the same rate, such as butylene diacrylate, and (ii) a graft-linking monomer which has a plurality of addition polymerizable reactive groups some of which polymerize at substantially different rates than others, such as diallyl maleate, is typically polymerized as part of the elastomeric core.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Ethylenically unsaturated monomers such as glycidyl methacrylate, or an alkyl ester of an unsaturated carboxylic acid, for example a $C_1$–$C_8$ alkyl acrylate like methyl acrylate, hydroxy ethyl acrylate or hexyl acrylate, or a $C_1$–$C_8$ alkyl methacrylate such as methyl methacrylate or hexyl methacrylate, or mixtures of any of the foregoing, are some of the vinyl monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 45% to about 95% by weight of an elastomeric core and about 60% to about 5% of a rigid thermoplastic phase. The elastomeric core can be polymerized from about 75% to about 99.8% by weight $C_1$–$C_6$ acrylate, preferably n-butyl acrylate. The rigid thermoplastic phase can be polymerized from at least 50% by weight of $C_1$–$C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928, each of which is incorporated herein. Various diene-based and acrylate-based core-shell grafted copolymers are available commercially from Rohm & Haas as the Acryloid™ or Paraloid™ elastomers.

Other supplemental impact modifiers or elastomers useful in the compositions of this invention are those based generally on a long-chain, hydrocarbon backbone ("olefinic elastomers"), which may be prepared predominantly from various mono- or dialkenyl monomers and may be grafted with one or more styrenic monomers. Representative examples of a few olefinic elastomers which illustrate the variation in the known substances which would suffice for such purpose are as follows: butyl rubber; chlorinated polyethylene rubber; chlorosulfonated polyethylene rubber; an olefin polymer or copolymer such as ethylene/propylene copolymer, ethylene/styrene copolymer or ethylene/propylene/diene copolymer, which may be grafted with one or more styrenic monomers; neoprene rubber; nitrile rubber; polybutadiene and polyisoprene.

An example of a preferred olefinic elastomer is a copolymer which has a a glass transition temperature ($T_g$) less than 0° C. prepared from (i) at least one olefin monomer such as ethylene, propylene, isopropylene, butylene or isobutylene, or at least one conjugated diene such as butadiene, and the like, or mixtures thereof; and (ii) an ethylenically unsaturated monomer carrying an epoxide group (for example, glycidyl methacrylate), and, optionally, (iii) an ethylenically unsaturated monomer which does not carry an epoxide group (for example, vinyl acetate). $T_g$ is the temperature or temperature range at which a polymeric material shows an abrupt change in its physical properties, including, for example, mechanical strength. $T_g$ can be determined by differential scanning calorimetry.

Component (e) in the compositions of this invention is a molding polymer selected from (i) polyester, (ii) other olefin-based polymers, and mixtures thereof.

Component (e)(i), a polyester, as utilized in the compositions of this invention may be made by the self-esterification of hydroxycarboxylic acids, or by direct esterification, which involves the step-growth reaction of a diol with a dicarboxylic acid with the resulting elimination of water, giving a polyester with an -[-AABB-]- repeating unit. The reaction may be run in bulk or in solution using an inert high boiling solvent such as xylene or chlorobenzene with azeotropic removal of water.

Alternatively, but in like manner, ester-forming derivatives of a dicarboxylic acid can be heated with a diol to obtain polyesters in an ester interchange reaction. Suitable acid derivatives for such purpose are alkyl esters, halides, salts or anhydrides of the acid. Preparation of polyarylates, from a bisphenol and an aromatic diacide, can be conducted in an interfacial system which is essentially the same as that used for the preparation of polycarbonate.

Polyesters can also be produced by a ring-opening reaction of cyclic esters or $C_4$–$C_7$ lactones, for which organic tertiary amine bases phosphines and alkali and alkaline earth metals, hydrides and alkoxides can be used as initiators.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene arylenedicarboxylate), a poly(arylene alkanedicarboxylate), or a poly(arylene arylenedicarboxylate) is therefore appropriate for use herein. Alkyl portions of the polymer chain can be substituted with, for example, halogens, $C_1$–$C_8$ alkoxy groups or $C_1$–$C_8$ alkyl side chains and can contain divalent heteroatomic groups (such as —O—, —Si—, —S— or —$SO_2$—) in the paraffinic segment of the chain. The chain can also contain unsaturation and $C_6$–$C_{10}$ non-aromatic rings. Aromatic rings can contain substituents such as halogens, $C_1$–$C_8$ alkoxy or $C_1$–$C_8$ alkyl groups, and can be joined to the polymer backbone in any ring position and directly to the alcohol or acid functionality or to intervening atoms.

Typical aliphatic diols used in ester formation are the $C_2$–$C_{10}$ primary and secondary glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethanol together with ethylene glycol in esterification with terephthalic acid forms a clear, amorphous copolyester of particular interest. Also contemplated are liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters, those prepared from an aromatic diacid, such as the poly(alkylene arylenedicarboxylates) polyethylene terephthalate and polybutylene terephthalate, or mixtures thereof, are particularly useful in this invention. A polyester suitable for use herein may have an intrinsic viscosity of about 0.4 to 1.04, although values outside this range are permitted as well.

Methods and materials useful for the production of polyesters, as described above, are discussed in greater detail in Whinfield, U.S. Pat. No. 2,465,319, Pengilly, U.S. Pat. No. 3,047,539, Schwarz, U.S. Pat. No. 3,374,402, Russell, U.S. Pat. No. 3,756,986 and East, U.S. Pat. No. 4,393,191, each of which is incorporated herein by reference.

Component (e)(ii) includes a variety of olefin-based polymers which are not part of the category of linear ethylene polymers described above as component (b). These other olefin-based polymers include conventional high density or heterogeneously branched linear ethylene polymers, any of which can be grafted or ungrafted. Examples of such polymers include high density polyethylene, low density polyethylene, linear low density polyethylene, ultra low density polyethylene, polypropylene, polyisobutylene, ethylene/acrylic acid copolymer, ethylene/vinyl acetate copolymer, ethylenethylyl alcohol copolymer, ethylene/carbon monoxide copolymer (including those described in U.S. Pat. Nos. 4,916,208 and 4,929,673, each being incorporated herein), ethylene/propylene/carbon monoxide copolymer, ethylene/carbon monoxide/acrylic acid copolymer, polystyrene, poly(vinyl chloride), and the like and mixtures thereof. In the suspension process for preparing poly(vinyl chloride), vinyl chloride monomer can be copolymerized with other vinyl monomers, such as vinyl acetate, acrylonitrile, butadiene, butyl acrylate, maleic anhydride, an olefin or styrene, to produce a random, block or graft copolymer.

A variety of additives may be advantageously employed to promote flame retardance or ignition resistance in the compositions of this invention. Representative examples thereof include the oxides and halides of the metals of Groups IVA and VA of the periodic table such as the oxides and halides of antimony, bismuth, arsenic, tin and lead such as antimony oxide, antimony chloride, antimony oxychloride, stannic oxide, stannic chloride and arsenous oxide; the organic and inorganic compounds of phosphorous, nitrogen, boron and sulfur such as aromatic phosphates and phosphonates (including halogenated derivatives thereof), alkyl acid phosphates, tributoxyethyl phosphate, 1,3-dichloro-2-propanol phosphate, 3,9-tribromoneopentoxy-2,4,8,10-tetraoxa-3,9-diphosphaspiro (5.5)undecane-3,9-dioxide, phosphine oxides, ammonium phosphate, zinc borate, thiourea, urea, ammonium sulfamate, ammonium polyphosphoric acid and stannic sulfide; the oxides, halides and hydrates of other metals such as titanium, vanadium, chromium and magnesium such as titanium dioxide, chromic bromide, zirconium oxide, ammonium molybdate and stannous oxide hydrate; antimony compounds such as antimony phosphate, sodium antimonate, $KSb(OH)_6$, $NH_4SbF_6$ and $SbS_3$; antimonic esters of inorganic acids, cyclic alkyl antimonite esters and aryl antimonic acid compounds such as potassium antimony tartrate, the antimony salt of caproic acid, $Sb(OCH_2CH_3)$, $Sb[OCH(CH_3)CH_2CH_3]_3$, antimony polyethylene glycorate, pentaerythritol antimonite and triphenyl antimony; boric acid; alumina trihydrate; ammonium fluoroborate; molybdenum oxide; halogenated hydrocarbons such as hexabromocyclodecane; decabromomdiphenyl oxide; 1,2-bis(2,4,6-tribromophenoxy) ethane; halogenated carbonate oligomers such as those prepared from Tetrabromobisphenol-A; halogenated epoxy resins such as brominated glycidyl ethers; tetrabromo phthalic anhydride; fluorinated olefin polymers or copolymers such as poly(tetrafluoroethylene); octabromodiphenyl oxide; ammonium bromide; isopropyl di(4-amino benzoyl) isostearoyl titanate; and metal salts of aromatic sulfur compounds such as sulfates, bisulfates, sulfonates, sulfonamides and sulfimides; other alkali metal and alkaline earth metal salts of sulfur, phosphorus and nitrogen compounds; and others as set forth in Laughner, U.S. Pat. No. 4,786,686, which is incorporated herein; and the like, and mixtures thereof. A preferred flame retardant additive is antimony trioxide ($Sb_2O_3$). When a flame retardant is used in the compositions of this invention, it is typically used in an amount of up to about 15 percent, advantageously from about 0.01 to 15 percent, preferably from about 0.1 to 10 percent and more preferably from about 0.5 to 5 percent, by weight of the total composition.

A variety of additives may be advantageously used in the compositions of this invention for other purposes such as the following: antimicrobial agents such as organometallics, isothtazolones, organosulfurs and mercaptans; antioxidants such as phenolics, secondary amines, phophites and thioesters; antistatic agents such as quaternary ammonium compounds, amines, and ethoxylated, propoxylated or glycerol compounds; fillers and reinforcing agents such as talc, clay, mica, silica, quartz, kaolin, aluminum nitride, $TiO_2$, calcium sulfate, $B_2O_3$, alumina, glass flakes, beads, whiskers or filaments, nickel powder and metal or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-pthalates, adipates and benzoates; heat stabilizers such as organotin mercaptides, an octyl ester of thioglycolic acid and a barium or cadmium carboxyalte; ultraviolet light stabilizers such as a hindered amine, an o-hydroxy-phenylbenzotriazole, a 2-hydroxy, 4-alkoxybenzophenone, a salicylate, a cyanoacrylate, a nickel chelate and a benzylidene malonate and oxalanilide. A preferred hindered phenolic antioxidant is Irganox™ 1076 antioxidant, available from Ciba-Geigy Corp. Such additives, if used, typically do not exceed 45 percent by weight of the total composition, and are advantageously from about 0.001 to 15 percent, preferably from about 0.01 to 10 percent and more preferably from about 0.1 to 10 percent, by weight of the total composition.

To illustrate the practice of this invention, an example of a preferred embodiment is set forth below, however, this example (Example 1) does not in any manner restrict the scope of this invention. Some of the particularly desirable features of this invention may be seen by contrasting the characteristics of Example 1 with those of various controlled formulations (Controls A-E) which do not possess the features of, and are not therefore embodiments of, this invention.

The compositions of Example 1 and Controls A-E are prepared by mixing the dry components in paint shaker for 5 minutes, and then feeding the dry-blended formulation to a 30 mm Werner & Pfleiderer extruder set at 280° C. (barrel zone temperture), 250 rpm and 70–85 percent torque. The extrudate is cooled in the form of strands and is then comminuted as pellets. The pellets are dried in an air draft oven for 3 hours at 120° C., and are then used to prepare test specimens on a 70 ton Arburg molding machine having temperature zone settings of 150° C., 200° C., 250° C., 250° C. and 250° C., and a mold temperature of 80° C.

The formulation content of Example 1 and Controls A-E is given below in Table I, in parts by weight of the total composition. In Table I:

"Polycarbonate" is a Bisphenol-A polycarbonate having a weight average molecular weight of 28,000;

"LLDPE I" is a linear low density polyethylene having a melt index, according to ASTM D 1238, of 2;

"LLDPE II" is a linear low density polyethylene having a melt index, according to ASTM D 1238, of 26;

"EPR" is a copolymer of 45 weight percent ethylene and 55 weight percent propylene;

"MBS" is methacrylate/styrene/butadiene copolymer (Paraloid™ 8967 elastomer from Rohm & Haas); and "HBLEP" is a homogeneously branched linear ethylene polymer, as described above as component (b), having a density of approximately 0.89 g/cm³ and a melt index, according to ASTM D 1238, of about 10.

The following tests are performed on Example 1 and Controls A-E, and the results of these test are also shown in Table I:

Impact resistance is measured by the Izod test ("Izod") according to ASTM Designation D 256-84 (Method A) at −35° C. The notch is 10 mils (0.254 mm) in radius. Impact is perpendicular to the flow lines in the plaque from which the bar is cut. Izod results are reported in ft-lb/in.

Weldline impact resistance is also measured by the Izod test according to ASTM Designation D 256-84 (Method A) at room temperature (23°–25° C.), but with respect to a sample which is formed with a butt weld in a double gated mold. The sample is unnotched, and it is placed in the vise so that the weld is 1 mm above the top surface of the vise jaws. Weldline results are also reported in ft-lb/in.

Percent elongation at break is measured in accordance with ASTM Designation D 638-84 at a rate of 2"/minute.

Viscosity is determined by placing a disc molded from the composition between two plates, each of which rotates reciprocatingly through an arc of 0.1 radian with a frequency of one second while the disc is held at 270° C. The power consumption required to maintain the stated arc and frequency is proportional to the viscosity of the composition. Viscosity is stated in poise.

TABLE I

Content and Properties of Controls A-E and Example I

| | Controls | | | | | |
|---|---|---|---|---|---|---|
| | A | B | C | D | E | Example 1 |
| Polycarbonate | 100 | 95 | 95 | 95 | 95 | 95 |
| LLDPE I | | 5 | | | | |
| LLDPE II | | | 5 | | | |
| EPR | | | | 5 | | |
| MBS | | | | | 5 | |
| HBLEP | | | | | | 5 |
| −35° C. Izod (ft-lb/in) | 2.8 | 1.9 | 2.3 | 3.7 | 12.3 | 11.0 |
| RT Weldline (ft-lb/in) | 45 | 5 | 8 | | 38 | 23 |
| Percent elongation | 210 | 96 | 105 | 169 | 44 | 101 |
| Viscosity (poise) | | | | | 10,000 | 9,000 |

The data in Table I demonstrate that while polycarbonate has good toughness and weldline properties, it has poor impact resistance at low temperatures. Use of MBS as a modifier in a composition with polycarbonate produces a material which has improved low-temperature impact properties, but this comes at a sacrifice of toughness, as indicated by a significant reduction in tensile strength. Addition to polycarbonate of other kinds of olefin-based modifiers by themselves, such as LLDPE or EPR, produces a material which, in general, has good toughness, but is characterized by poor performance with respect to other properties. By contrast, Example 1, in which polycarbonate is blended with a homogeneeously branched linear ethylene polymer, shows a desirable balance of relatively good values in all properties tested: low-temperture impact resistance, toughness and weldline. This overcomes the problem frequently caused by previous modifiers which, while improving one property of polycarbonate, create an offsetting decline in other properties. Example 1 shows no tendency toward delamination, and the lower viscosity of Example 1 makes it easier to process.

What is claimed is:

1. A composition of matter comprising, in admixture,
   (a) a polycarbonate,
   (b) a linear ethylene polymer which has:
      (i) a density of less than 0.93 g/cm³;
      (ii) a molecular weight distribution, $M_w/M_n$, of less than about 3.0; and
      (iii) a Composition Distribution Branch Index of greater than about fifty percent;
      (iv) no long chain branching
   (c) a polymer selected from the group consisting of:
      (i) a styrenic copolymer;
      (ii) a supplemental impact modifier; and
      (iii) blends of (i) and (ii); and
   (d) optionally one or more molding polymers.

2. The composition of claim 1 wherein the polymer (c) is a styrenic copolymer (c)(i).

3. The composition of claim 2 wherein the styrenic copolymer (c)(i) is a vinyl aromatic/vinyl nitrile copolymer.

4. The composition of claim 2 wherein the styrenic copolymer (c)(i) is a styrene/acrylonitrile copolymer.

5. The composition of claim 2 wherein the styrenic copolymer (c)(i) is a rubber-modified vinyl aromatic/vinyl nitrile copolymer.

6. The composition of claim 5 wherein the rubber-modified vinyl aromatic/vinyl nitrile copolymer is acrylonitrile/EPDM/styrene copolymer.

7. The composition of claim 2 wherein the molding polymer (d) is polyester.

8. The composition of claim 1 wherein the component c polymer is a supplemental impact modifier (c)(ii).

9. The composition of claim 8 wherein the supplemental impact modifier (c)(ii) is an olefinic elastomer copolymer which has a glass transition temperature of less than 0° C., prepared from:
   (i) one or more olefin monomers, one or more conjugated dienes, or a mixture thereof;
   (ii) an ethylenically unsaturated monomer carrying an epoxide group; and
   (iii) optionally, an ethylenically unsaturated monomer which does not carry an epoxide group.

10. The composition of claim 9 wherein the ethylenically unsaturated monomer carrying an epoxide group is a glycidyl ester of an unsaturated carboxylic acid.

11. The composition of claim 9 wherein the ethylenically unsaturated monomer carrying an epoxide group is glycidyl methacrylate.

12. The composition of claim 9 wherein the olefinic elastomer is a copolymer prepared from ethylene and glycidyl methacrylate.

13. The composition of claim 12 wherein the olefinic elastomer is a copolymer prepared from ethylene, glycidyl methacrylate, and vinyl acetate.

14. The composition of claim 8 wherein the molding polymer (d) is polyester.

15. The composition of claim 1 wherein the linear ethylene polymer has a molecular weight distribution, $M_w/M_n$, of about 1.5 to about 2.5.

16. The composition of claim 1 in the form of a molded or extruded article.

17. The composition of claim 1 wherein the linear ethylene polymer has a Composition Distribution Branch Index of greater than about ninety percent.

18. The composition of claim 1 wherein the linear ethylene polymer has a single melting peak when measured by differential scanning calorimetry.

19. The composition of claim 1 wherein the linear ethylene polymer has an $I_2$ melt index, as measured according to ASTM D 1238, Condition 190° C./2.16 kg, of about 0.1 to about 250 g/10 min.

20. The composition of claim 1 wherein the linear ethylene polymer has a density of about 0.85 to about 0.90 g/cm$^3$.

21. The composition of claim 1 wherein the linear ethylene polymer is a copolymer of ethylene with a $C_3$ to $C_{20}$ alpha-olefin.

22. The composition of claim 1 wherein the linear ethylene polymer is a copolymer of ethylene with propylene, 1-butene, 1-hexene or 1-octene.

23. The composition of claim 1 further comprising a filler.

24. The composition of claim 23 wherein the filler is talc, clay, mica, glass or a mixture thereof.

25. The composition of claim 1 further comprising one or more ignition resistance additives selected from halogenated hydrocarbons, halogenated carbonate oligomers, halogenated diglycidyl ethers, organophosphorous compounds, fluorinated olefins, antimony oxide and metal salts of aromatic sulfur compounds.

* * * * *